US006679422B2

(12) United States Patent
Brown et al.

(10) Patent No.: US 6,679,422 B2
(45) Date of Patent: Jan. 20, 2004

(54) AUTOMATIC TELLER SYSTEM AND METHOD OF MARKING ILLEGALLY OBTAINED CASH

(75) Inventors: Michael Wayne Brown, Georgetown, TX (US); Rabindranath Dutta, Los Angeles, CA (US); Michael A. Paolini, Round Rock, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/062,330

(22) Filed: Jan. 31, 2002

(65) Prior Publication Data

US 2003/0141372 A1 Jul. 31, 2003

(51) Int. Cl.[7] .......................... G06F 17/60; G06K 5/00
(52) U.S. Cl. ...................................... 235/379; 235/380
(58) Field of Search ................................ 235/379, 380; 705/40, 45

(56) References Cited

U.S. PATENT DOCUMENTS

| | | | | |
|---|---|---|---|---|
| 4,675,815 A | * | 6/1987 | Kuroki et al. | 379/37 |
| 5,321,242 A | | 6/1994 | Heath, Jr. | 235/382 |
| 5,354,974 A | | 10/1994 | Eisenberg | 235/379 |
| 5,731,575 A | * | 3/1998 | Zingher et al. | 235/379 |
| 5,949,880 A | | 9/1999 | Curry et al. | 380/24 |
| 6,021,494 A | | 2/2000 | Bolan et al. | 713/200 |
| 6,065,672 A | * | 5/2000 | Haycock | 235/379 |
| 6,131,718 A | * | 10/2000 | Witschorik | 194/206 |
| 6,154,879 A | | 11/2000 | Pare, Jr. et al. | 902/3 |
| RE37,122 E | | 4/2001 | Levine et al. | 235/380 |
| 6,478,220 B2 | * | 11/2002 | Seifert et al. | 235/379 |

FOREIGN PATENT DOCUMENTS

| | | |
|---|---|---|
| EP | 1 022 422 A1 | 7/2000 |
| WO | WO 00/05688 | 2/2000 |

* cited by examiner

*Primary Examiner*—Karl D. Frech
*Assistant Examiner*—April Nowlin
(74) *Attorney, Agent, or Firm*—Cynthia S. Byrd; Streets & Steele; Jeffrey L. Streets

(57) ABSTRACT

An automatic teller system and a method of operating the system wherein the system can receive a personalized normal PIN or duress PIN from a user. If the user enters the duress PIN, the system determines that it is a duress PIN and actuates a silent alarm to notify authorities of the possible crime. The system will then simulate a normal transaction, perhaps with a reduced maximum withdrawal amount, so as to not alert a thief or potential thief that the alarm has been actuated, while dispensing bills marked with special ink that is visible only when viewed under special light. Also, the serial numbers of the bills dispensed under duress are recorded by the automatic teller system and automatically communicated to authorities. Under duress conditions, it is preferable that the monitoring of the ATM be enhanced.

22 Claims, 3 Drawing Sheets

AUTOMATIC TELLER SYSTEM AND METHOD OF MARKING ILLEGALLY OBTAINED CASH

BACKGROUND OF THE INVENTION

1. Field of the Invention

The present invention relates to an automatic teller system and a method of operating the automatic teller system.

2. Background of the Related Art

Current automatic teller systems allow a user having an account ("account holder") to withdraw cash from an automatic teller machine (ATM) by first inserting or "swiping" a bank card into a card reader and thereafter entering a personal identification number (PIN) on a keypad. The automatic teller system is operated by a computer that reads electronically stored information from the bank card to determine whether the user entering the PIN is authorized to make a cash withdrawal from the account on the basis of the correctness of the PIN. If the correct PIN is used, the automatic teller system thereafter determines the cash withdrawal limit for the account. The automatic teller system then prompts the user through a display for the amount of cash to be withdrawn, and the user enters the requested amount of cash on the keypad. The request is processed up to a preset dollar limit determined by the bank and the user, and an amount of cash within the limit is dispensed to the user.

In recent years, thieves have robbed automatic teller machine users by either accosting the user after completing a transaction, or by coercing the user, under the threat of immediate bodily harm, to make a withdrawal from the user's account. While the installation of surveillance cameras may have deterred some amount of this activity, the inability to view multiple angles and the lack of human-monitoring of the camera signals makes it impossible for the system to determine whether or not an ongoing transaction is legitimate. Rather, the video feed from the ATM camera is relegated to belated reconstruction of the crime and possible identification of the perpetrator.

Many systems and devices for thwarting the robbery may exist, but it is much more important to promote the safety of the individual account holder than to prevent the robbery. Therefore, even if the robbery was readily detectable prior to dispensing the cash, it may not be wise to refuse to dispense cash. This is particularly true since security or police protection is at best a few minutes away.

Therefore, there is a need for a system and method which promote the safety of ATM users while providing a way to thwart the robbery. It would be desirable if the system and method appear to a robber to be indistinguishable from a normal ATM withdrawal transaction. It would be further desirable if the system and method provided real time detection of the robbery.

SUMMARY OF THE INVENTION

The present invention provides an automatic teller system and method for marking and identifying illegally obtained bills without alerting the thief. The automatic teller system, upon receiving an input duress PIN, reads and records the unique serial number on each bill dispensed to a user that has entered a duress PIN and, either automatically or upon command, electronically provides the serial numbers of the potentially stolen bills to the appropriate authorities. Optionally, a number of previously marked bills may be dispensed by the automatic teller system from a special supply of marked bills having previously recorded serial numbers, or the bills may be marked and the serial numbers scanned and recorded by the automatic teller system as the bills are being dispensed. The automatic teller system also applies a message or code, using special invisible ink, to each bill dispensed to the user. The message or code printed on the bill makes the bill more easily recognizable as being a stolen bill when held under a special light to illuminate the message or code, e.g. ultraviolet light. Furthermore, the ink gets onto the thief's hands to aid in identifying the thief. If the thief is later apprehended by authorities and is in possession of bills dispensed from the ATM, marked by the ATM and having serial numbers recorded by the ATM, then the present invention provides reliable evidence to be used in prosecuting the thief.

The user's duress PIN will preferably have a format that is similar to that of the user's normal PIN, so that it is improbable that a thief observing the user's entry of the duress PIN on the key pad would know that the user's duress PIN was entered since the number sequence is not readily identifiable. In particular, the duress PIN and normal PIN should contain the same number of characters and the same type of characters. Especially since the duress PIN results in the dispensing of cash, the thief will presumably have no reason to suspect an alarm has been triggered.

In one embodiment, the system accepts a PIN having a certain number of digits assigned to the user and a certain number of digits that are option codes. The option codes may allow the user to initiate a variety of predetermined actions or enter a variety of predetermined information. The predetermined actions may include, without limitation, setting an alarm, taking a picture, triggering a false error message, and calling a friend. Such predetermined actions are only limited by the nature of electronic communications and control, how widely the electronic communication of the network will reach and the authority that the user has provided to facilitate the requested actions. The predetermined information may include, without limitation, the user's duress, the number of thieves, the type of weapons carried by the thieves, and how many people are with you. For example, assume that a PIN is made up of five digits, the first four digits being dedicated to a unique identification number or password associated with the account, and the fifth digit dedicated to a predetermined option code. Continuing with the example, the predetermined option codes may include: "0" to indicate no duress; and "1" through "9" to indicate duress with the same number of thieves present as the number entered. Consequently a PIN entry of "84632" would be entered if the unique identification number was "8463" and the transaction was being made under duress with "2" thieves present. Optionally, some digits may be dedicated to other user-defined action or information as set out in the user's preferences registered and maintained by the card issuer. In accordance with this format, it is possible to have more than one "normal PIN" and/or more than one "duress PIN".

The present invention includes an apparatus comprising a means for receiving either a normal PIN or a duress PIN input by a user, a means for determining that an entered PIN is a duress PIN, a means responsive to that determination for actuating an alarm, preferably a silent alarm, and a means for dispensing bills bearing multiple unique and recorded features that distinguish each bill from others. The automatic teller system according to the present invention simulates a normal transaction notwithstanding its determination that a duress PIN has been entered by the user.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
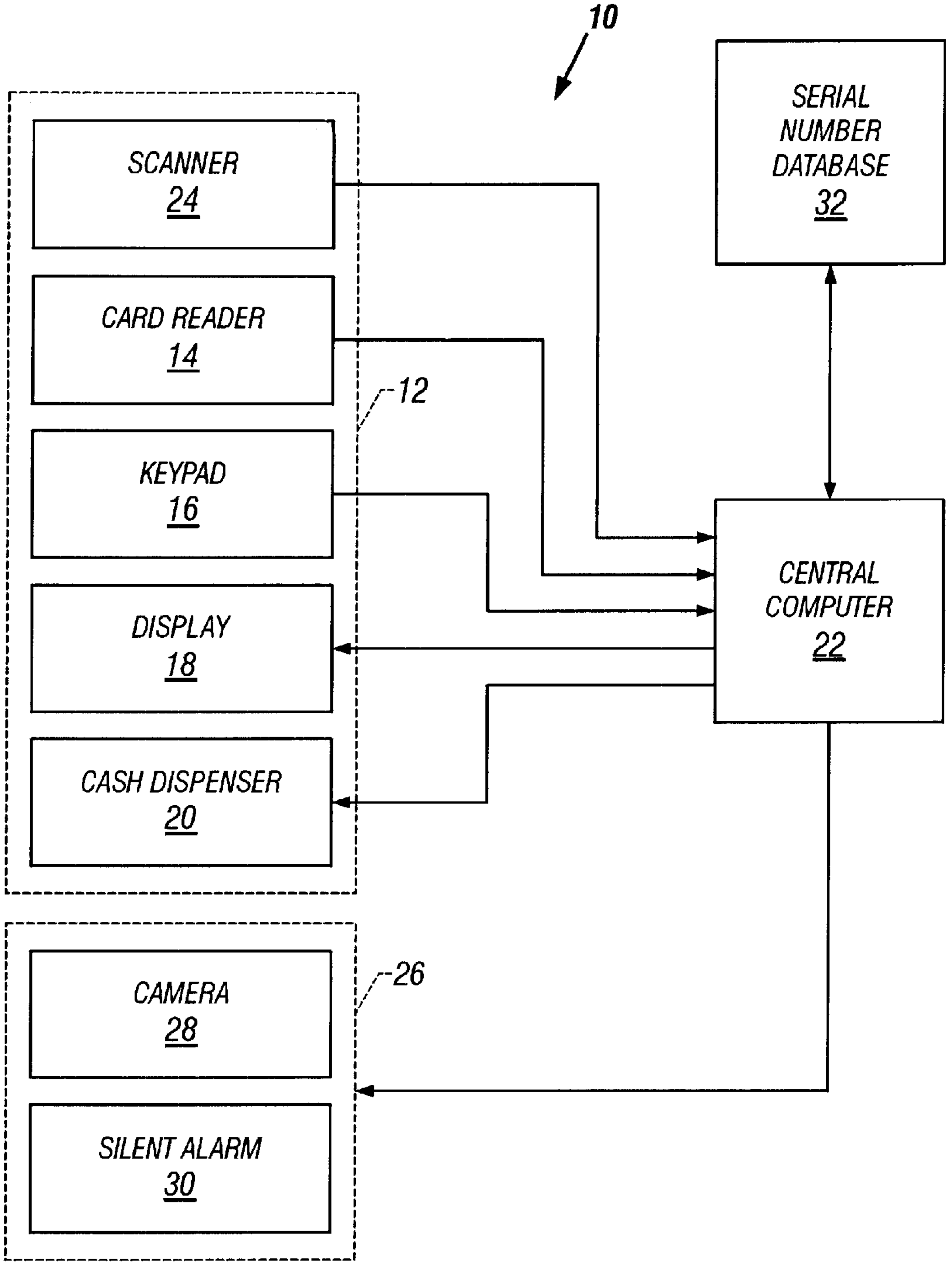
FIG. 1 is a schematic diagram of the automatic teller machine in accordance with the present invention

Referring now to FIG. 1, a system 10 according to the present invention includes an automatic teller machine (ATM) 12 that includes a magnetic strip or microchip embedded card reader 14, a user keypad 16, a display 18 and a cash dispenser 20. The system also includes a central computer 22 that receives the information read from the card reader 14 and personal identification numbers entered on keypad 16 by the card user. The computer 22 also prompts the user or provides information to the user via display 18, and actuates cash dispenser 20 to dispense cash to the user.

Optionally, the central computer 22 is electronically coupled to an optical scanner 24 and uses optical character recognition (OCR) technology which is capable of identifying bills dispensed from the ATM, for example to determine and record the serial number on each dispensed bill after a user enters a duress PIN. The central computer 22 also includes or is in communication with a serial number database 32 for storing and retrieving serial numbers of currency that has been deposited into or dispensed from the ATM 12. The central computer 22 also has direct or indirect communication with a security system 26, preferably including at least a camera 28 and a silent alarm 30.

Figure 2A:
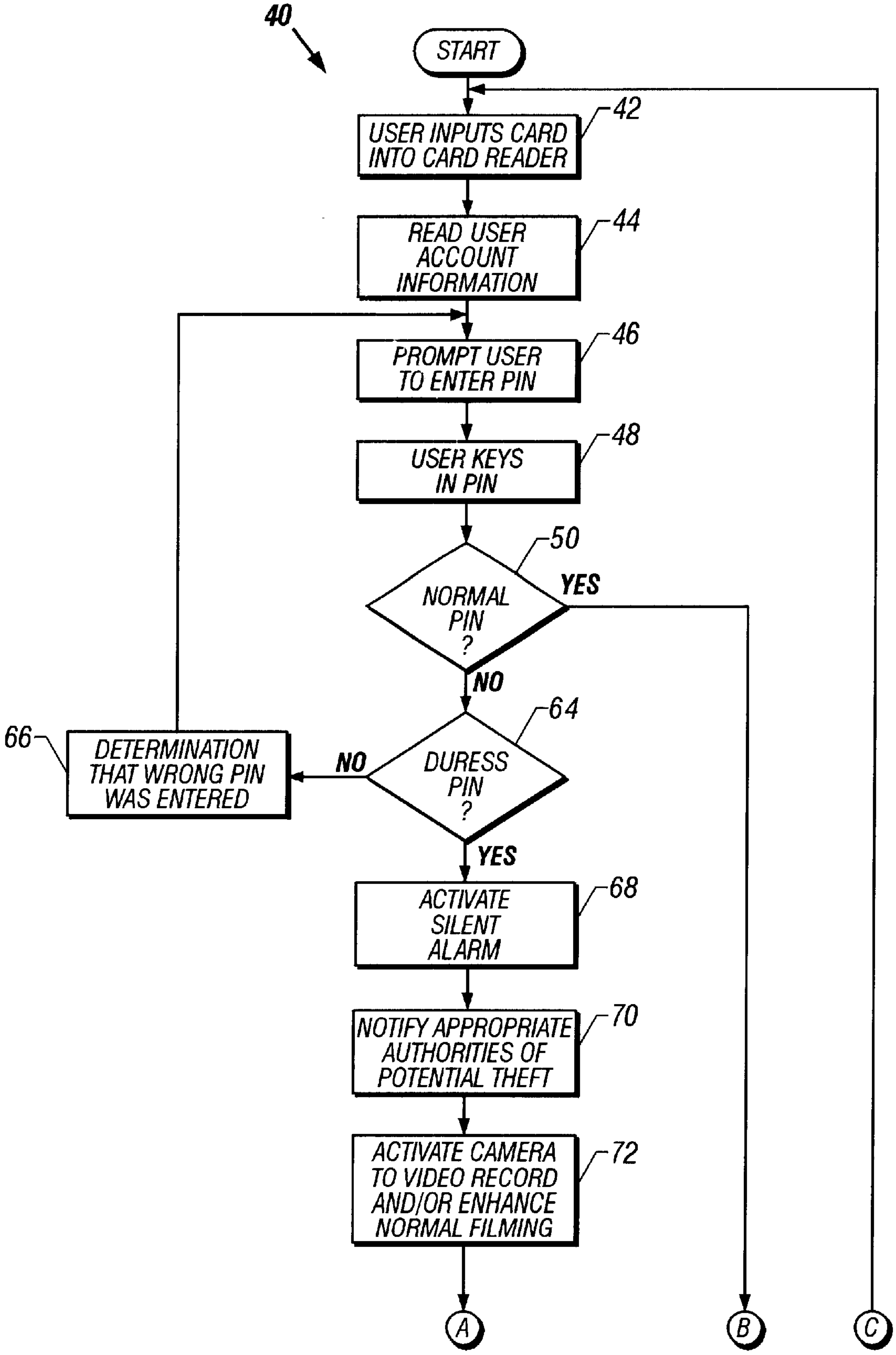
FIGS. 2A–2B is a flowchart of the method of operating the automatic teller machine of FIG. 1.
Figure 2B:
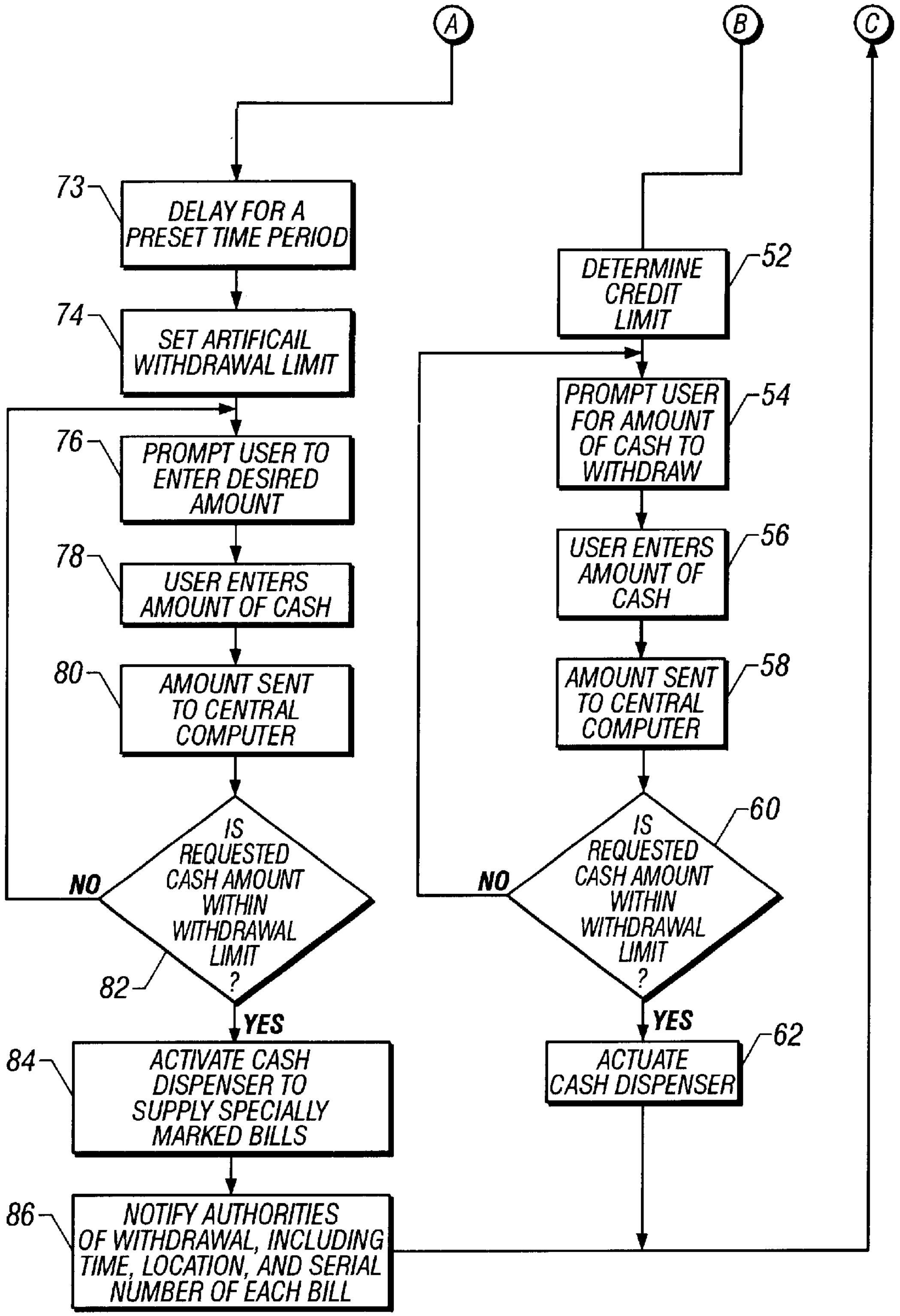

FIGS. 2A and 2B provide a flowchart of a method 40 for operating the automatic teller system set forth in FIG. 1. In state 42, the user places a magnetic stripe or microchip embedded card into a card reader 14, and, in step 44, the card reader 14 reads the user account information stored in the magnetic stripe or microchip in the card. The user account information is electronically sent to the central computer 22 that then, in step 46, prompts the user, using display 18, to enter a PIN. The user inputs the PIN in step 48 using the keypad 16. This information is electronically sent to the central computer 22 that, in step 50, determines whether the entered PIN is a normal PIN (no duress) associated with the identified account. If the PIN entered by the user on the keypad 16 is determined to be a normal personal PIN, then the computer 22 determines the credit limit in step 52, and uses display 18 in step 54, to prompt the user to enter the amount of cash desired for withdrawal. The user then enters the amount of cash desired in step 56 using keypad 16. The amount of cash desired by the user is electronically sent to the central computer 22 in step 58. In step 60, the central computer 22 compares the amount of cash desired by the user to the maximum withdrawal limit recorded in the database 32. If the amount of cash desired by the user is within the maximum withdrawal limit, in step 62, the central computer 22 actuates the cash dispenser to dispense the desired amount of cash to the user, and the system then returns to the ready state of step 42.

The foregoing portion of the method 40 is the most typically used process. However, if the central computer 22 determines in step 50 that the PIN entered by the user is not a normal personal PIN associated with the identified account, then the central computer makes a determination in step 64 whether the entered PIN is a duress PIN associated with the identified account. If the entered PIN is not a duress PIN, the determination is made in step 66 that the number entered by the user using the keypad 16 is just an incorrect PIN, and the user is again prompted in step 46 to enter a PIN using the keypad 16. After a preset number of incorrect PINs have been entered, the ATM notifies the user that the request cannot be processed and keeps the transaction card.

If the central computer 22 determines in step 64 that the PIN entered by the user is a duress PIN associated with the identified account, then the central computer 22 acts to perform certain duress-specific functions. The first duress-specific function occurs in step 68. In step 68, the central computer 22 activates a silent alarm 30 and in step 70, the central computer 22 notifies appropriate authorities that a potential theft or assault is occurring at the specific location of the ATM. In step 72, the central computer activates camera 28 to video-record the location at the ATM or to enhance normal filming, such as by obtaining a close up of the location or increasing the number of frames per second that are recorded, and perhaps recording audio during and after the duress transaction takes place. Optionally, upon receiving the duress PIN, a second camera could also be used or the audio/video signal could be patched through to an alarm monitoring service. In step 73, the system delays the withdrawal process for a preset time period in order to keep the thief at the scene longer while the authorities, having received the silent alarm, are rushing to the scene. A preferred means of delay is to stream advertising onto the display in a manner that appears normal, such as by advertising refinance or credit offers of the bank that owns the ATM.

The duress process performed by the central computer 22 is intended to simulate a normal ATM withdrawal and to thereby avoid alerting the potential thief that the silent alarm 30 has been activated. Referring to FIG. 2B, this simulation of a normal withdrawal is emphasized by aligning the steps 74 through 84 of the duress process on the left side of the chart with the steps 52 through 62 of the normal process on the right side of the chart. While there are actual differences in the two processes, the differences are not observable to anyone at the ATM.

In step 74, the central computer 22 optionally sets an artificial withdrawal limit and, in step 76, uses the display 18 to prompt the user to enter the desired amount of cash via the keypad 16. The user then enters the desired amount of cash using keypad 16 in step 78. The amount of cash desired by the user is electronically sent to the central computer 22 in step 80. In step 82, the central computer 22 compares the amount of cash desired by the user to the artificial withdrawal limit set in step 74. If the amount of cash desired by the user is not within the artificial withdrawal limit, then the process returns to step 76. However, if the amount is within the artificial withdrawal limit, then, in step 84, the central computer 22 actuates the cash dispenser to dispense the desired amount of cash to the user, preferably from a special reserve supply of specially marked bills.

The special reserve supply contains bills marked with special ink that can be seen only under a special light source, such as an ultraviolet light source. Bills in the special reserve supply also bear recorded serial numbers, such as the unique 11 character serial numbers comprising a mixture of numbers and letters that are applied to bills made by the U.S. Treasury. The bills in the special reserve supply all have serial numbers that have been previously recorded in a database, and, in step 86, the serial numbers of the bills dispensed to a user entering a duress PIN are electronically communicated to authorities along with the time of the entry of the duress PIN and the location of the ATM in which the duress PIN was entered. The system then returns to the ready state in step 42.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of operating an automatic teller system, comprising the steps of:

receiving entry of an account number and a PIN into the automatic teller system;

determining whether the PIN entered is a duress PIN associated with the account number; and upon receiving the duress PIN, dispensing a bill marked with a special invisible ink, wherein the bill is marked with a message or code that includes location or transaction information.

2. The method of claim 1, further comprising:

upon receiving the duress PIN, enhancing monitoring at the automatic teller system.

3. The method of claim 2, wherein the enhanced monitoring is selected from initiating audio monitoring, initiating use of an additional camera, transmitting an audio or video signal to a monitoring service, and combinations thereof.

4. The method of claim 1, further comprising:

scanning the bill as the bill is dispensed to identify a serial number on the bill; and storing the serial number of the bill scanned.

5. The method of claim 1, wherein the bill that is dispensed upon receiving the duress PIN is provided from a special supply of marked bills.

6. The method of claim 5, further comprising:

storing the serial number of the marked bill.

7. The method of claim 1, further comprising:

upon receiving the duress PIN, enforcing an artificial maximum amount of dispensed cash.

8. The method of claim 1, further comprising:

initiating a silent alarm, wherein the silent alarm notifies emergency response authorities that a duress situation may exist.

9. The method of claim 1, wherein the special invisible ink is visible only under an artificial light source.

10. The method of claim 1, further comprising:

enabling cameras at the automatic teller system upon receiving the duress PIN.

11. An automatic teller system, comprising:

receiving means for receiving entry of an account number and a PIN into the automatic teller system;

determining means for determining whether the PIN entered is a duress PIN associated with the account number;

a bill dispenser for dispensing a bill; and a marker, wherein the marker uses a special invisible ink to mark the bill with a message or code that includes location or transaction information.

12. The system of claim 11, further comprising:

initiating means for initiating a silent alarm.

13. The system of claim 11, wherein the invisible ink is visible only under an artificial light source.

14. The system of claim 11, further comprising:

scanning means for scanning the bill as the bill is dispensed to identify a serial number on the bill; and memory means for storing the serial number of the marked bill.

15. A computer program product for operating an automatic teller system, comprising:

receiving instructions for receiving entry of an account number and a PIN into the automatic teller system;

determining instructions for determining whether the PIN entered is a duress PIN associated with the account number; and dispensing instructions for dispensing a bill; and upon receiving the duress PIN, marking instructions for marking the bill with a message or code, wherein the bill is marked with a special invisible ink, and wherein the bill is marked with a message or code that includes location or transaction information.

16. The computer program product of claim 15, further comprising:

enabling instructions for enabling cameras at the automatic teller system upon receiving the duress PIN.

17. The computer program product of claim 15, wherein the bill that is dispensed upon receiving the duress PIN is provided from a special supply of marked bills.

18. The computer program product of claim 15, further comprising:

scanning instructions for scanning the bill as the bill is dispensed to identify a serial number on the bill; and storing instructions for storing the serial number of the dispensed bill.

19. The computer program product of claim 15, further comprising:

enforcing instructions for enforcing an artificial maximum amount of dispensed cash upon receiving the duress PIN.

20. The computer program product of claim 15, wherein the initiating instructions for initiating a silent alarm include notifying instructions for notifying emergency response authorities that a duress situation may exist.

21. The computer program product of claim 15, further comprising:

enhancing instructions for enhancing monitoring at the automatic teller system upon receiving the duress PIN.

22. The computer program product of claim 21, wherein the enhancing instructions are selected from initiating instructions for initiating audio monitoring, initiating instructions for initiating use of an additional camera, transmitting instructions for transmitting an audio or video signal to a monitoring service, and combinations thereof.

* * * * *